Figure 1:
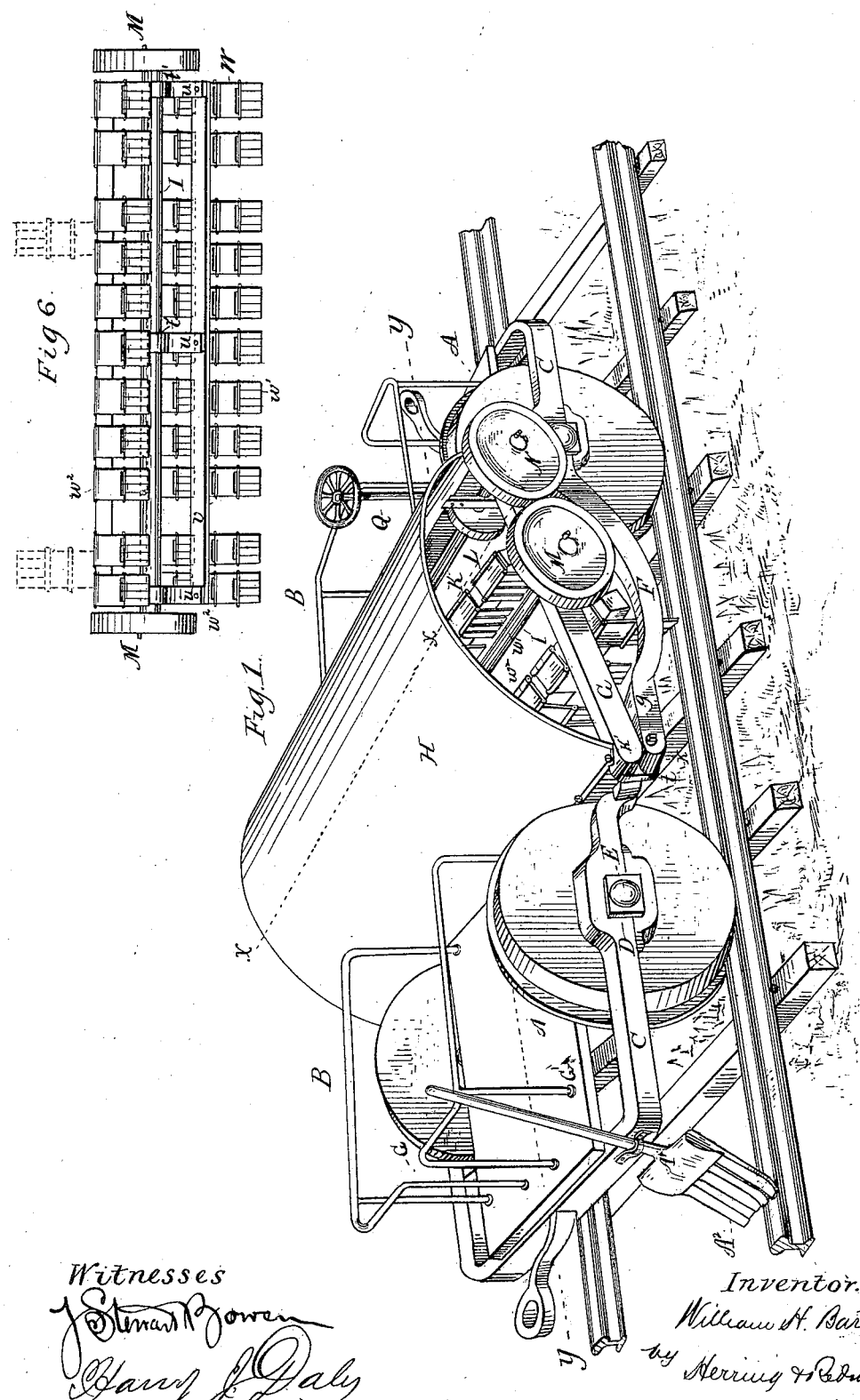

(No Model.) 3 Sheets—Sheet 1.

W. H. BARTELS.
GRASS AND WEED CUTTING MACHINE FOR RAILROAD TRACKS.

No. 337,361. Patented Mar. 9, 1886.

Witnesses

Inventor.
William H. Bartels
by Herring & Redmond
Atty's.

(No Model.) 3 Sheets—Sheet 2.

W. H. BARTELS.

GRASS AND WEED CUTTING MACHINE FOR RAILROAD TRACKS.

No. 337,361. Patented Mar. 9, 1886.

Witnesses:

Inventor.
William H. Bartels
by Herring & Redmond
Atty's (No Model.) 3 Sheets—Sheet 3.
W. H. BARTELS.
GRASS AND WEED CUTTING MACHINE FOR RAILROAD TRACKS.
No. 337,361. Patented Mar. 9, 1886.
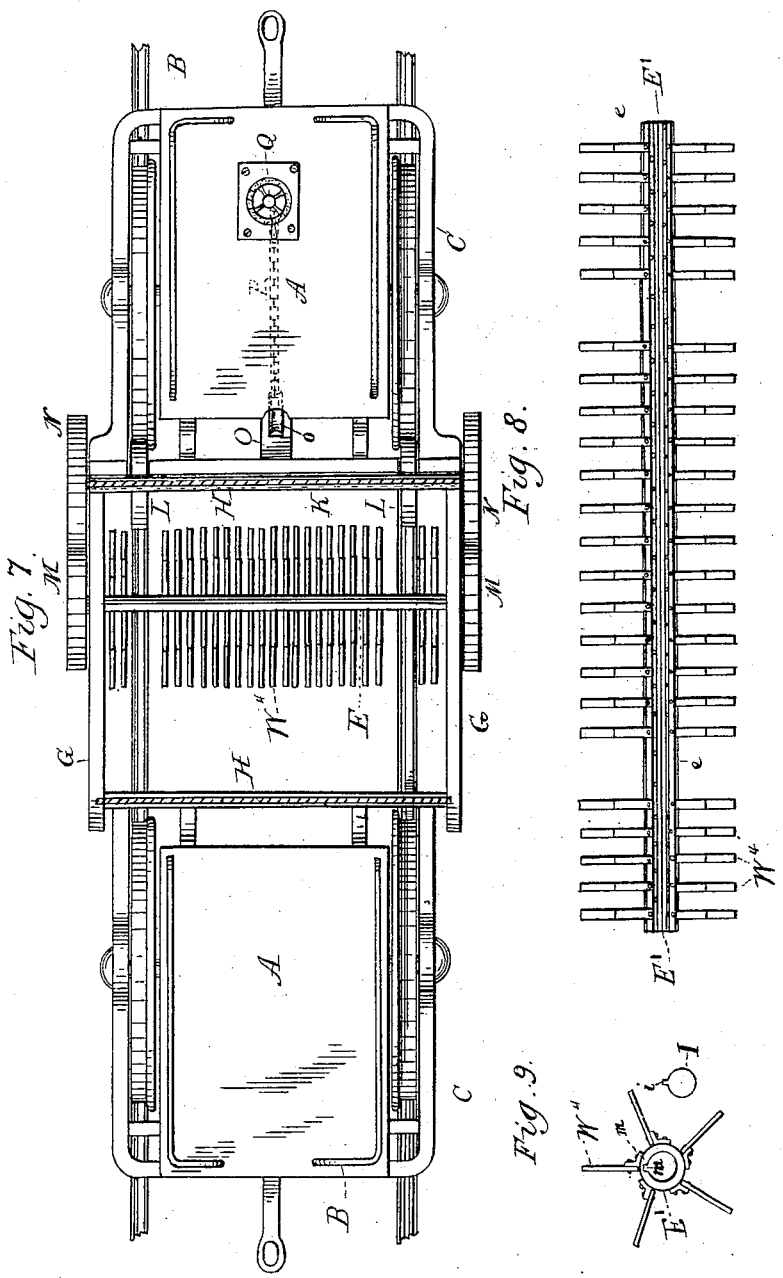
Witnesses:
J. Stewart Bowen.
Harry J. Daly
Inventor:
William H. Bartels
by Herring & Redmond
Attys.

UNITED STATES PATENT OFFICE.

WILLIAM HENRY BARTELS, OF CARTHAGE, ILLINOIS, ASSIGNOR OF TWO-THIRDS TO GEORGE EDMUNDS, OF SAME PLACE, AND GUS VOTE, OF FAIRFIELD, IOWA.

GRASS AND WEED CUTTING MACHINE FOR RAILROAD-TRACKS.

SPECIFICATION forming part of Letters Patent No. 337,361, dated March 9, 1886.

Application filed September 3, 1885. Serial No. 176,105. (No model.)

*To all whom it may concern:*

Be it known that I, WILLIAM HENRY BARTELS, a citizen of the United States, residing at Carthage, in the county of Hancock and State of Illinois, have invented certain new and useful Improvements in Grass and Weed Cutting Machines for Railroad-Tracks; and I do hereby declare the following to be a full, clear, and exact description of the invention, such as will enable others skilled in the art to which it appertains to make and use the same.

My invention relates to machines for cutting grass and weeds from railroad-tracks, and is an improvement on the machine described in an application for Letters Patent made by me on or about the 9th day of February, 1885, Serial No. 155,360, and which was allowed March 5, 1885, Patent No. 325,824, September, 1, 1885.

The machine described in the application above referred to, while performing its work better than any machine for the same purpose that I am aware of, has some defects which this present invention is intended to cure. I find that the machine mentioned will not cut the grass and weeds which grow in close proximity to the rails, owing to the fact that the plate or cutter carrying cylinder does not extend the entire width of the space between the rails, and could not be brought sufficiently close to said rails to cut the grass, &c., without the cutters interfering with or striking the car-wheels when said cutters are rotated. This is occasioned by the manner in which the cylinder is driven—*i. e.*, by friction-wheels in contact with the car-wheels. Therefore, where a car-wheel is six inches in thickness or width, and the upper surface of the rail but two inches wide, it will be impossible to bring the edges of the cutters nearer than three or four inches to the side of the rail, thus leaving a line of growing vegetation three or four inches in width immediately alongside of the rail, where it is most liable to bend over the rails and be crushed, so that its sap will "grease" the rails and prevent the car-wheels revolving. I also find that the rotation of the cylinder in a direction opposite to the direction of rotation of the car-wheels prevents the effectual destruction of the grass and weeds, for the reason that the motion of the train creates a draft or current of air which bends the vegetation forward in the direction of motion of train, to be beaten down by the cutters without wholly destroying it; besides, the cylinder throws the cut grass and weeds forward or in front of the machine again and again, until finally they accumulate in such quantities as to have a tendency to clog the operation of the machine; also, in said machine the cylinder cannot be thrown into and out of gear or contact with the car-wheels without stopping the train.

Now, this invention is intended to obviate the above-mentioned objectionable features, and also presents some improvements in other details, whereby a machine is produced which will be complete in itself, and which may be attached to the rear car of any train with no more expenditure of time or labor than that attending the coupling of one car to another; and it consists in the parts and combination of parts hereinafter described and claimed.

Figure 2:
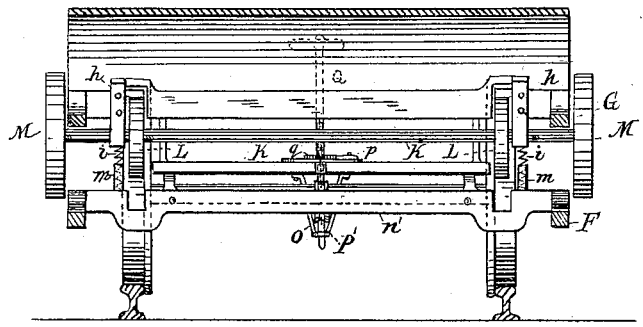
Figure 4:
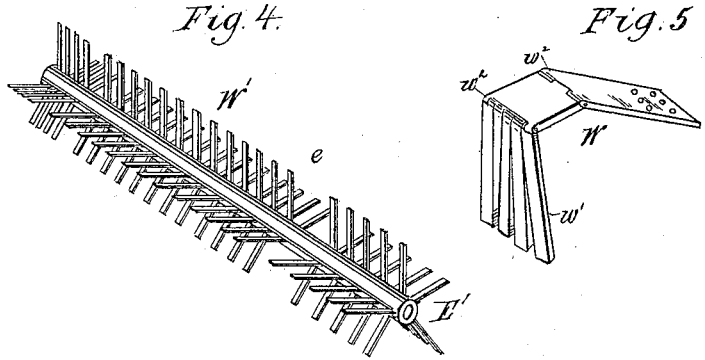
Figure 5:
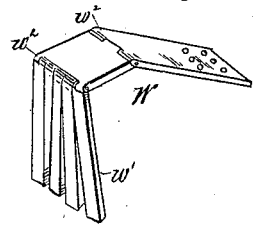
Figure 3:
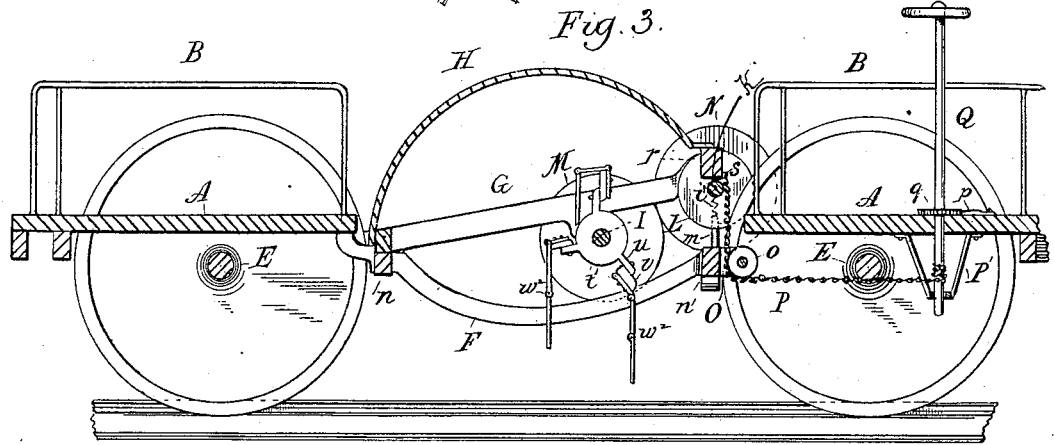

In the drawings forming part of this specification, Figure 1 is a perspective view of my improved machine; Fig. 2, a transverse vertical section on the line *x x*, Fig. 1; Fig. 3, a longitudinal section on the line *y y*, Fig. 1; Fig. 4, a perspective view of the brush-cylinder; Fig. 5, a perspective view of a modification of one of my improved cutting-plates; Fig. 6, a perspective view of the improved cutting-cylinder carrying the modified cutting-plate; Fig. 7, a plan view of the machine, the dome being broken away to show the brush-cylinder in position for operation; Fig. 8, a side elevation of the brush-cylinder, and Fig. 9 an end detail view of the same.

Similar letters refer to similar parts throughout the several views.

A represents the platform, B the guard-rails, C the side beams, F the bowed beams, and *n n'* the transverse connecting-bars of the frame of my machine. The side beams, C, are provided with journal-boxes D for the axles E of the car-wheels. The rear ends of the bowed beams F form offsets or shoulders *k*, to which the protecting hood or dome H is hinged by means of the extensions *t*, which extend downward from corresponding offsets or shoulders, $k'$, formed on the ends of the brace-bars G, and screw-bolts $g$, which pass through perforations in the shoulders $k$ and extension $t$. The dome H is thereby rendered capable of vertical adjustment to a limited degree, for the purpose of throwing the driving mechanism into and out of gear or contact, as will be hereinafter explained. This dome, which is made of boiler-iron, preferably, (but it may be made of any other suitable material,) spans the space between the car-wheels and entirely covers the cutting-cylinder. By removing the bolts $g$ the dome H and attached parts may be lifted entirely off the machine to make any needed repairs.

The brace-bars G are provided with journal-boxes for the cylinder-shaft I. Said shaft also has pinned thereto three (more or less) disks, $t'$, which are provided with short arms $u$, to which are bolted or riveted the bars $v$, and to the latter I screw or bolt the upper plate of the sectional hinged cutting-plates W. The disks $t'$, arms $u$, bars $v$, and sectional hinged cutting-plates W comprise the cutting-cylinder. These plates are made of flat pieces or sheets of steel and in sections, three or four in number, and are joined or hinged together at $w^2$, so that they may give or yield, if brought in contact with any obstacle of a hard nature—such as a projecting tie or a rock—and pass such obstacle without injury and resume their position for operation. Thus far their description answers that of the plates described in my application of February 9, 1885; but I have discovered that they will not operate to as good advantage when the entire lower plate is made of one solid piece of metal, because they will not cut or destroy grass, &c., in crevices on the road-bed, and are liable to catch in guard-rails, frogs, &c., in passing over switches. I obviate these objectionable features by making the end cutting-plates of strips of metal, $w'$, hinged together at their upper ends, $w^2$, as fully illustrated in Figs. 5 and 6.

As shown, the plates are arranged to follow each other in the same track; but I propose, also, to arrange them so that the plates on one bar will break joint with those on the next, as in dotted lines, Fig. 6.

To the shaft I, which, with the cutting-cylinder-protecting hood or dome H and bowed beams F, extends outwardly on both sides beyond the rails, the cutting-plates immediately above the rails being omitted, are keyed or otherwise removably secured the friction-wheels M, one on each end. By simply removing these wheels or pulleys M and unpinning the disks $t'$, the shaft can be drawn out through the boxes, which will permit the cutting-cylinder to drop to the ground and be removed, and the brush-cylinder W' to be inserted in lieu thereof. The shaft I is provided with a spline, $i$, which fits into a groove, $m$, in the brush-cylinder W', and, when desired, the wheels M may be removed from the ends of the shaft I and the latter withdrawn, permitting the brush-cylinder to drop to the ground.

This brush-cylinder consists of a hollow tube, E'. A steam-pipe or boiler-flue will answer the purpose admirably, having flanges $e$ riveted or bolted thereon longitudinally. I show five such flanges in the drawings; but any number desired may be used. To these flanges are riveted or bolted strips $W^4$, extending in an unbroken line from rail to rail over the road-bed. Then two or more rows of strips are missed or omitted immediately over the rails, and the line commenced again and carried out to the end of the shaft, which extends some distance beyond the rails on each side of the road-bed.

The strips $W^4$ are made preferably of spring-steel—saw-blade metal will answer the purpose—of any suitable shape in cross-section, and are made in one continuous piece, having no hinges or joints whatever. Though I prefer to use spring-steel in the manufacture of these strips, yet I may use rattan or hickory splits with good results.

The brush-cylinder is intended to take the place of the cutter-cylinder referred to above after the latter has cut the grass and weeds as short as they can be cut, the brush-cylinder working upon the ground and tearing, uprooting, and sweeping the vegetation entirely from the road-bed.

To the front end of the dome H are secured two or more hangers, $h$, which support the shaft K, said shaft carrying the small friction pulleys or wheels L L. The wheels L are secured to the shaft at a short distance from their ends within the dome H, and are held in contact with the car-wheels, to revolve said shaft and the friction-wheels N thereon, which are in contact with the friction-wheels M M of the cylinder-shaft I, thus giving motion to the cutter-cylinder. The use of friction pulleys or wheels has many advantages in a machine of this type over cog-wheels or other gearing, for in the event of the cutting-plates getting caught or meeting any obstruction which will prevent their turning with the cylinder the friction-wheels will slip or slide past each other, and the revolution of the cylinder-shaft will be stopped until the obstruction is passed or the plates become loosened, when the machine will immediately resume operation, while if cog-gearing were used and the plates should get caught the whole machine would be wrecked. To the lower ends of the hangers $h$, I secure the ends of spiral springs $i'$ $i'$. The lower ends of these springs rest in cups $m$ $m$, which are firmly secured to the transverse bar $n'$, which connects the forward ends of the bowed beams F. A frame, O, is secured to the transverse bar $n'$ at its front side, which forms the bearings for a grooved wheel, $o$, around which is passed a chain, P, one end of which is provided with a hook to catch into an eyebolt secured to the front $r$ of the dome H, while the other end is connected to the lower end of an upright rod, Q, which passes through the platform, its lower end being supported in suitable bearings. This rod Q is provided with a suitable brake-wheel at its upper end, by which it may be turned or rotated. The rod Q is also provided with a ratchet-wheel, $q$, and to the platform is pivoted a pawl or detent, $p$, which catches into the teeth of the ratchet-wheel and holds it in any position to which it may be turned. When it is desired to start the cutter-cylinder, the brake-wheel is turned in the direction to wind the chain P on the rod Q, and thus draw the dome H and its parts down until the friction-wheels L come into contact with the car-wheels and start the cylinder revolving through the action of the wheels M N. All that it is necessary to do to stop the machine is to simply unwind the chain, when the springs $i$ will force the dome H and its attached parts upward and away from the car wheels and tracks.

A' is a broom, which is made of spring-metal strips A². Two of these brooms are secured to the rear end of the frame, one immediately above each rail and partly resting thereon, and sweeping the road-bed on both sides thereof, so as to tear, uproot, and sweep the weeds, &c., from both sides of and off the rails.

Having thus described my invention, what I claim as new, and desire to secure by Letters Patent, is—

1. A cutting cylinder or drum for grass and weed cutting machines, comprising the shaft I, the friction-wheels M, the disks $t$, arms $u$, rods $v$, and hinged cutting-plates W, substantially as set forth.

2. The combination, in a grass and weed cutting machine, of a suitable frame, a cutter-cylinder, friction-wheels M N, the transverse shaft K, and friction-wheels L, substantially as and for the purpose described.

3. In a machine for cutting grass and weeds from railroad-tracks, the combination, with a suitable frame-work, of the dome H, brace-bars G, the cutter-cylinder, the shaft I, carrying friction-wheels M, and the shaft K, carrying the friction-wheels N and L, substantially as and for the purpose set forth.

4. A cutter-cylinder for machines for cutting grass and weeds from railroad-tracks, comprising a shaft, disks removably secured thereto, carrying projecting arms, rods secured to said arms, and metallic cutting-plates secured to said rods, substantially as set forth.

5. The combination, with a suitable frame-work and car-wheels, of a cutting-cylinder carrying metallic strips, the friction-wheels M, transverse shaft K, friction-wheels N and L, and means for throwing the friction-wheels L into and out of contact with the car-wheels, substantially as and for the purpose described.

6. In a machine for cutting grass and weeds from railroad-tracks, the combination of the dome H, the bowed beams F, the brace-bars G, the offsets or shoulders $k\,k'$, the extensions $t$, and screw-bolt $g$, substantially as described.

7. In a machine for cutting grass and weeds from railroad-tracks, the combination of the dome H, the bowed beams F, the brace-bars G, the offsets or shoulders $k\,k'$, the extensions $t$, screw-bolt $g$, the cups $m$, and the spiral springs $i$, substantially as and for the purpose described.

8. In a machine for cutting grass and weeds from railroad-tracks, the combination of the hinged dome H, the eye $s$, the bowed beams F, the brace-bars G, the shaft I, the cutter-cylinder, the shaft K, the friction-wheels M N L, the transverse bar $n'$, the frame O, grooved wheels $o$, the chain P, rod Q, the pawl $p$, and ratchet $q$, substantially as and for the purpose described.

9. A machine for cutting grass and weeds from railroad-tracks, comprising the following elements: a suitable frame-work and wheels, a hinged dome, brace-bars, a shaft journaled in said bars, the cutter-cylinder, the plates of which are formed in strips, the transverse shaft K, the friction pulleys or wheels L M N, the rod Q, ratchet-wheel $q$, pawl $p$, chain P, grooved wheel $o$, frame O, eyebolt $s$, spiral springs $i$, and cups $m$, all as and for the purpose set forth.

10. In a machine for cutting grass and weeds from railroad-tracks, the combination, with a suitable frame-work, of brooms A', secured to the rear end of said frame, substantially as described.

11. The combination, in a grass and weed cutting machine, of the shaft I, the tube E', flanges $e$, strips W⁴, and means for securing the rotation of the tube with the shaft, substantially as and for the purpose described.

12. In a grass and weed cutting machine, the combination of the frame brush cylinder, its shaft I, the friction-wheels M, the shaft K, friction-wheels L N, and means for throwing the wheels L in contact with the driving mechanism, substantially as described.

13. A brush-cylinder for machines for cutting grass and weeds from railroad-tracks, consisting of the tube E', having a groove, $m$, the flanges $e$, riveted to said tube, and the spring-metal strips W⁴, riveted to said flanges, substantially as described.

In testimony whereof I affix my signature in presence of two witnesses.

WILLIAM HENRY BARTELS.

Witnesses:
   JNO. D. MILLER,
   W. E. MASON.